(No Model.)
P. J. WIBORG.
POTATO DIGGER.
No. 481,645. Patented Aug. 30, 1892.
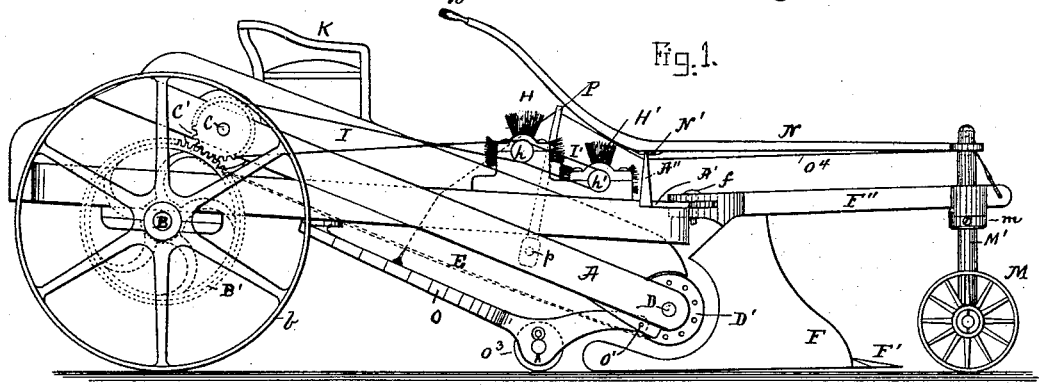
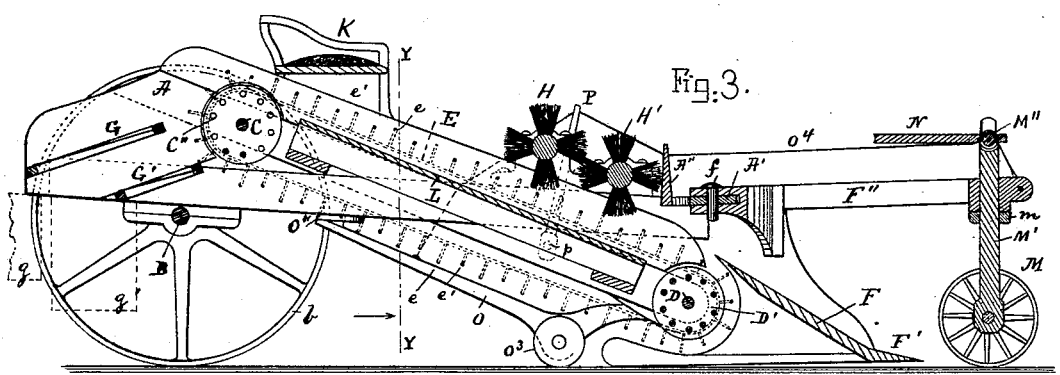
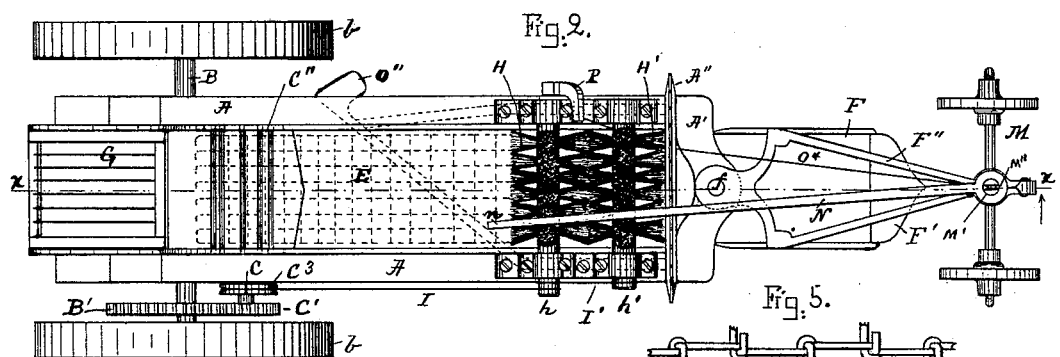
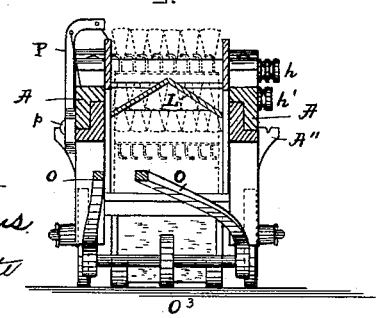
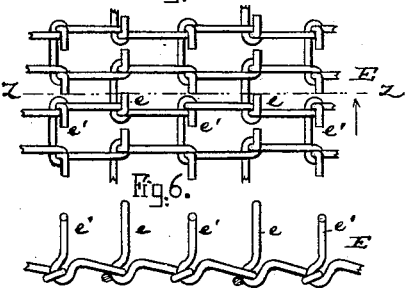
Witnesses.
Alice A. Perkins
Geo. W. White
Inventor
Pehr J. Wiborg
by Alban Andrew, his atty

UNITED STATES PATENT OFFICE.

PEHR J. WIBORG, OF BOSTON, MASSACHUSETTS.

POTATO-DIGGER.

SPECIFICATION forming part of Letters Patent No. 481,645, dated August 30, 1892.

Application filed May 15, 1891. Serial No. 392,823. (No model.)

*To all whom it may concern:*

Be it known that I, PEHR J. WIBORG, a citizen of Sweden, and a resident of Boston, in the county of Suffolk and State of Massachusetts, have invented new and useful Improvements in Potato-Diggers, of which the following, taken in connection with the accompanying drawings, is a specification.

This invention relates to improvements in potato-digging machines, and it is carried out as follows, reference being had to the accompanying drawings, wherein—

Figure 1 represents a side elevation of the improved machine. Fig. 2 represents a top plan view. Fig. 3 represents a longitudinal section on the line X X shown in Fig. 2. Fig. 4 represents a cross-section on the line Y Y shown in Fig. 3. Fig. 5 represents a detail plan view of a portion of the endless apron by means of which the potatoes are carried from the scoop or digger to the boxes at the rear end of the machine, and Fig. 6 represents a cross-section on the line Z Z shown in Fig. 5.

Similar letters refer to similar parts wherever they occur on the different parts of the drawings.

The machine consists of a frame composed of a pair of side pieces A A, which are secured together at a proper distance apart, as is usual in machines of this kind.

In bearings in the rear portion of the frame A A is journaled the axle B, to the ends of which are secured the wheels $b\ b$.

B' is a spur-gear secured to the shaft B, the teeth of which mesh in the teeth of a pinion C', secured to the shaft C, which is journaled in the sides A A and has secured to it between the latter a sprocket-wheel or chain-roller C'', as shown. D' is a similar sprocket-wheel or chain-roller secured to a shaft D, located in bearings in the lower forward ends of the frame A A, and E is a perforated endless apron or screen supported on and carried by said sprocket-wheels, as shown in Fig. 3. The endless apron E has on its surface a series of alternate long and short rows upon it for the purpose of carrying the potatoes from the scoop F at the forward end of the machine to the boxes or receptacles at the rear end thereof. By making the endless apron in this manner the larger and smaller potatoes will be separated from each other while being carried on the apron, the smaller ones being free to rest on the apron between the hooks or prongs $e\ e'$ and the larger ones will be supported on the outer ends of said prongs and hooks.

Back of the roller C'' is a pair of stationary grates G and G', the former being arranged above the latter and having its grate-openings preferably somewhat wider than the lower one, so that in case any of the smaller potatoes should be deposited on the upper grate G they will drop through it and into a box or receptacle $g'$, arranged below the lower edge of the grate G', as shown in Fig. 3.

$g$ is a smaller box or receptacle for receiving the larger potatoes delivered by the apron E onto the upper grate G.

H H' are revolving brushes having their spindles or shafts located in bearings near the forward end of the frame A A. Said brushes are set in a rotary motion by means of a belt or cord I, carried from a pulley $C^3$ on the shaft C to a pulley $h$ on the brush H, and a belt or cord I', carried from said pulley $h$ to a similar pulley $h'$ on the brush H', as shown in Figs. 1 and 2, or in a similar or equivalent manner.

The brushes H H' serve for the purpose of cleaning the potatoes and separating the earth, weeds, &c., from them while being carried on the apron during the passage below said brushes.

K is the driver's seat, as usual.

L is an inclined roof-like plate secured below the screw E, upon which the screenings from the upper part of the apron fall and escape at opposite sides of the machine as it is being drawn onward during the digging operation.

F is the inclined scoop, having a pointed share F' at its lower forward end, as shown in Figs. 1, 2, and 3. Said share F' is adapted to open the row of hills or the drill and to carry the potatoes up on the inclined scoop and deliver them onto the endless apron as the machine is drawn forward.

F'' is the draw-bar, secured to or forming a part of the said scoop F, and to the forward end of such draw-bar the draft animals are to be hitched in any suitable manner.

A' is a cross-bar secured to the forward ends of the frames A A, as shown in Figs. 1, 2, and 3, and to said bar the scoop F is pivoted, preferably by means of a hinge-pin $f$, for the purpose of enabling the scoop to be guided properly in relation to the row of hills or drill during the digging operation. By having the scoop thus pivoted to the main frame the machine can be turned in a very small space as compared with devices in which the scoop is permanently attached to the frame of the machine.

M is the carriage, having a vertical stem M', which is loosely journaled in a bearing in the front end of the draw-bar F'', as shown in Figs. 1, 2, and 3.

$m$ is a collar adjustably secured to the stem M', said collar serving as a support for the draw-bar, and by means of such collar the front end of the scoop F can be adjusted up or down relative to the carriage, according to the depth below the surface desired for the share to enter during the digging operation.

To the upper end of the stem M' is secured a lever N, having a handle $n$ at its rear end, by means of which the driver is enabled to turn the carriage M to the right or left for swinging the scoop in a horizontal plane on the cross-bar A' of the main frame A for the purpose of properly guiding the scoop relative to the hills or drill, as well as for the purpose of guiding the machine when the scoop is raised out of working position, as may be needed in driving the machine to and from the potato-field or in turning it at the end of the field, as may be desired. The lever N may be temporarily held in position on the frame A A, preferably by means of a tooth or projection N' on said lever, adapted to rest in any one of the notches or recesses on the toothed locking-bar A'', secured to the frame A A, as shown in Figs. 1, 2, 3, and 4.

For the purpose of raising the scoop F above the ground in turning the machine or in driving it to and from the field I make use of the following mechanism, namely: To the lower front end of the frame A A is pivoted at O' a treadle-lever O, having at its upper end a foot-treadle O'', projecting to one side of the frame of the machine, as shown in Figs. 1, 2, 3, and 4. $O^3$ is a roller or wheel the shaft of which is journaled in said lever, said roller being arranged to roll loosely on the ground during the digging operation. $O^4$ is a cord or its equivalent, one end of which is attached to the lever O near its treadle O'' and the other end being attached to the forward end of the draw-bar F'', said cord being carried over a pulley or roller M'', mounted in the upper end of the stem M', as shown.

The cord $O^4$ may be guided in any suitable manner between its ends, and for this purpose I have shown in the drawings an arm or lever P, pivoted at $p$ to the frame of the machine and having the midway portion of the cord attached to it; but this is not essential, and any other suitable means for guiding said cord may be used without departing from the spirit of my invention.

When for any reason it is desired to raise the scoop F, it is only necessary for the driver to depress the treadle O'', by which the lever O is turned on the roller $O^3$ as a fulcrum, causing the forward end of the frame of the machine and the scoop to be raised more or less, as may be needed. By this means the scoop can be adjusted to any desired angle of inclination relative to the surface traversed.

The operation of the machine is as follows: As the machine is propelled by the draft-animals the share F' enters the hills or drill and causes the potatoes to be carried upward on the scoop F and onto the endless apron E, from which the potatoes drop into the grate G and G' and into the baskets or boxes $g$ $g'$. The earth, weeds, &c., are removed by the rotary brushes H H' and drop through the perforated apron E against the inclined plate L and from it to the ground on opposite sides of the machine.

The machine is guided by the operator by means of the lever N and the scoop is raised above the ground whenever so desired by the depression of the treadle O'', as hereinbefore described.

What I wish to secure by Letters Patent and claim is—

1. The combination, in a potato-digger, of a rising and falling main frame mounted on wheels and having an endless apron, a scoop pivotally connected at its upper end with the main frame and adapted to swing laterally in a horizontal plane, a lever mechanism for horizontally swinging the scoop, and an independent lever mechanism acting on the surface traversed to bodily raise the main frame and thereby elevate the scoop which is pivotally connected therewith, substantially as described.

2. The combination, in a potato-digger, of a main frame mounted on wheels and having an endless apron, a scoop pivoted to the forward end of the main frame and adapted to swing laterally in a horizontal plane, steering mechanism connected with the scoop for swinging the latter horizontally, and a lever mechanism for raising and lowering the main frame and attached scoop, substantially as described.

3. The combination, in a potato-digger, of a main frame mounted on wheels and having an endless apron, a scoop pivoted to the forward end of the main frame, adapted to swing laterally in a horizontal plane and provided with a draw-bar, a carriage traveling on the ground and having a spindle journaled in the draw-bar and provided with a lever for adjusting the carriage and causing the scoop to turn laterally on the main frame, and a lever mechanism for raising and lowering the main frame and attached scoop, substantially as described.

4. In a potato-digger, a frame A A and rollers journaled in the same, combined with an endless apron E, having alternate lateral rows of hooks $e$ $e'$, the length of the hooks in one row being different from the ones in front and rear, substantially as and for the purpose set forth.

5. In a potato-digger, a frame A A, mounted on wheels and having a scoop pivoted to its forward end, combined with a treadle-lever O O'', pivoted to the forward end of the frame, a roller or wheel on said lever, and a connecting device between said lever and the draw-bar of the scoop, substantially as and for the purpose set forth.

6. The combination, in a potato-digger, of a main frame mounted on wheels and having an endless apron, a scoop pivoted to the forward end of the main frame and adapted to swing laterally in a horizontal plane, a draw-bar connected with the scoop, a carriage having a spindle journaled in the draw-bar and provided with a lever, and a treadle mechanism adapted to act upon the surface traversed for lifting the scoop and main frame, substantially as described.

In testimony whereof I have signed my name to this specification, in the presence of two subscribing witnesses, on this 11th day of May, A. D. 1891.

PEHR J. WIBORG.

Witnesses:
ALBAN ANDRÉN,
THOMAS J. BARRY.